(12) United States Patent
Batley

(10) Patent No.: US 10,503,506 B2
(45) Date of Patent: Dec. 10, 2019

(54) APPARATUS AND METHOD FOR ACCESSING DATA IN A CACHE IN RESPONSE TO AN UNALIGNED LOAD INSTRUCTION

(71) Applicant: ARM LIMITED, Cambridge (GB)

(72) Inventor: Max John Batley, Cambridge (GB)

(73) Assignee: ARM Limited, Cambridge (GB)

( * ) Notice: Subject to any disclaimer, the term of this patent is extended or adjusted under 35 U.S.C. 154(b) by 377 days.

(21) Appl. No.: 14/886,174

(22) Filed: Oct. 19, 2015

(65) Prior Publication Data

US 2017/0109165 A1    Apr. 20, 2017

(51) Int. Cl.
*G06F 9/30* (2018.01)

(52) U.S. Cl.
CPC ...... *G06F 9/30043* (2013.01); *G06F 9/30098* (2013.01); *G06F 9/30145* (2013.01)

(58) Field of Classification Search
CPC ............ G06F 9/30043; G06F 9/30098; G06F 9/30145; G06F 9/3816; G06F 12/0862; G06F 12/0877; G06F 12/0802; G06F 12/0886; G06F 12/04
See application file for complete search history.

(56) References Cited

U.S. PATENT DOCUMENTS

| | | | | |
|---|---|---|---|---|
| 2003/0056089 A1* | 3/2003 | Senter | ................... | G06F 9/3004 712/225 |
| 2005/0027944 A1* | 2/2005 | Williams | ............ | G06F 9/30043 711/137 |
| 2007/0050592 A1* | 3/2007 | Gschwind | ........... | G06F 9/30036 711/201 |
| 2007/0106883 A1* | 5/2007 | Choquette | ........... | G06F 9/30036 712/225 |
| 2013/0013862 A1* | 1/2013 | Kannan | ................ | A61B 5/0538 711/119 |
| 2013/0246750 A1* | 9/2013 | Moyer | .................. | G06F 9/3004 712/219 |

(Continued)

OTHER PUBLICATIONS

Lei Jin, Sangyeun Cho, "Reducing Cache Traffic and Energy with Macro Data Load", 2006, IEEE, ISLPED'06, p. 147-150.*

(Continued)

*Primary Examiner* — Aimee Li
*Assistant Examiner* — Andrew J Cromer
(74) *Attorney, Agent, or Firm* — Nixon & Vanderhye P.C.

(57) ABSTRACT

A mechanism is provided for improving performance when executing unaligned load instructions which load an unaligned block of data from a data store. In a first unaligned load handling mode, a final load operation of a series of load operations performed for the instruction loads a full data word extending beyond the end of the unaligned block of data to be loaded by that instruction. If an initial portion of the unaligned block of data to be loaded by a subsequent unaligned load instruction corresponds to the excess part in the stream buffer for the earlier instruction, then an initial load operation for the subsequent instruction can be suppressed. A mechanism is also described for allowing series of dependent data access operations triggered by a given instruction to be halted partway through when a stall condition arises, and resumed partway through later, by defining overlapping sequences of transactions.

24 Claims, 8 Drawing Sheets

(56) References Cited

U.S. PATENT DOCUMENTS

| | | | |
|---|---|---|---|
| 2015/0026685 A1* | 1/2015 | Spadini | G06F 9/3836 |
| | | | 718/102 |
| 2015/0026686 A1* | 1/2015 | Spadini | G06F 9/3836 |
| | | | 718/102 |

OTHER PUBLICATIONS

Dan Nicolaescu, Alex Veidenbaum, Alex Nicolau, "Reducing Data Cache Energy Consumption via Cached Load/Store Queue", 2003, IEEE, ISLPED'03, p. 252-257.*

* cited by examiner

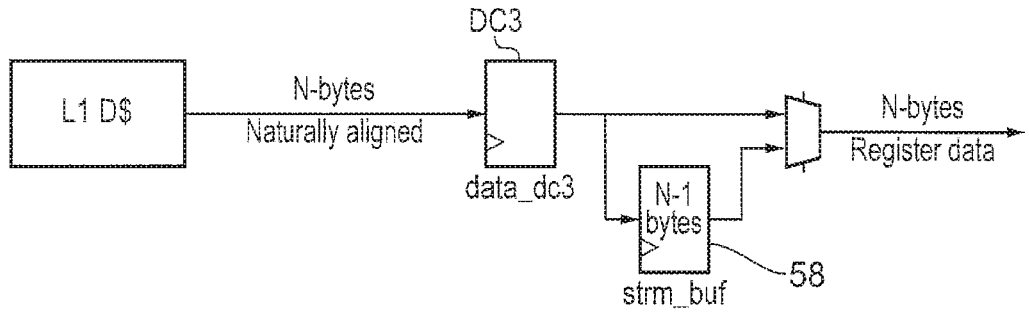
FIG. 3
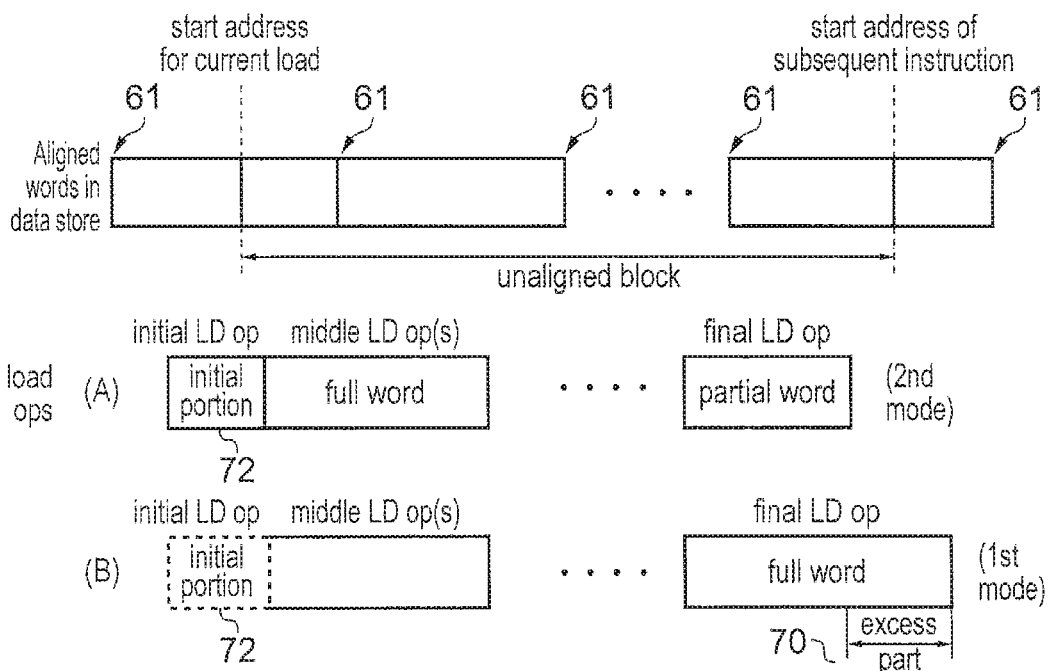
FIG. 4
FIG. 5

FIG. 6

| Between instructions | LDR x0, [0x2]; LDR x1, [0xA] | | | | | | |
|---|---|---|---|---|---|---|---|
| Cycle | 0 | 1 | 2 | 3 | 4 | 5 | 6 |
| DC1 | LD 0x02-0x07 | LD 0x08-0x09 | LD 0x0A-0x0F | LD 0x10-0x11 | | | |
| DC2 | | LD 0x02-0x07 | LD 0x08-0x09 | LD 0x0A-0x0F | LD 0x10-0x11 | | |
| DC3 | | | LD 0x02-0x07 | LD 0x08-0x09 | LD 0x0A-0x0F | LD 0x10-0x11 | |
| stream_buffer | | | | 0x02-0x07 | | 0x0A-0x11 | |
| register write | | | | 0x02-0x09 X0 | | X1 | |

FIG. 7

| Between instructions | | | | | | | |
|---|---|---|---|---|---|---|---|
| Cycle | 0 | 1 | 2 | 3 | 4 | 5 | 6 |
| DC1 | LD 0x02-0x07 | LD 0x08-0x0F | LD 0x10-0x11 | | | | |
| DC2 | | LD 0x02-0x07 | LD 0x08-0x0F | LD 0x10-0x11 | | | |
| DC3 | | | LD 0x02-0x07 | LD 0x08-0x0F | LD 0x10-0x11 | | |
| stream_buffer | | | | 0x02-0x07 | 0x0A-0x0F | | |
| stream_buffer_addr | | | | 0x00 | 0x08 | | |
| stream_buffer_strb[7:0] | | | | b1111_1100 | b1111_1100 | | |
| register write | | | | 0x02-0x09 X0 | 0x0A-0x11 X1 | | |

LD4 {V0.4S-V3.4S}, [0x4]

| Mem | 0x00 | 0x04 | 0x08 | 0x0C | 0x10 | 0x14 | 0x18 | 0x1C | 0x20 | 0x24 | 0x28 | 0x2C | 0x30 | 0x34 | 0x38 | 0x3C | 0x40 | 0x44 | 0x48 | 0x4C |
|---|---|---|---|---|---|---|---|---|---|---|---|---|---|---|---|---|---|---|---|---|
| Txs | A | | | | B | | | | C | | | | D | | | | E | | | |
| Regs | | A1 | A2 | A3 | B0 | B1 | B2 | B3 | C0 | C1 | C2 | C3 | D0 | D1 | D2 | D3 | E0 | | | |

Sequence 1

Sequence 2

LD4 {V0.4S-V3.4S}, [0x4]

| | A1 | B1 | C1 | D1 | A2 | B2 | C2 | D2 | A3 | B3 | C3 | D3 | B0 | C0 | D0 | E0 |
|---|---|---|---|---|---|---|---|---|---|---|---|---|---|---|---|---|
| | V0.Lo | | | V0.Hi | | | V1.Lo | | | V1.Hi | | | V2.Lo | | | V2.Hi | | | V3.Lo | | | V3.Hi |

| Cycle | 0 | 1 | 2 | 3 | 4 | 5 | 6 | 7 | 8 |
|---|---|---|---|---|---|---|---|---|---|
| Iss | A | B | C | D | E | | | | |
| DC1 | | A | B | C | D | E | | | |
| DC2 | | | A | B | C | D | E | | |
| DC3 | | | | A | B | C | D | E | |
| Strm buf (58) | | | | | A1-A3 | B1-B3 | C1-C3 | D1-D3 | |
| Perm buf (60) | | | | | | A1 A2 A3 B0 | A3 B0 B3 C0 | C1 C2 C3 D0 | C3 D0 D3 E0 |
| Reg wr | | | | | | V0.Lo (A1 B1)<br>V1.Lo (A2 B2) | V2.Lo (A3 B3)<br>V3.Lo (B0 C0) | V0.Hi (C1 D1)<br>V1.Hi (C2 D2) | V2.Hi (C3 D3)<br>V3.Hi (D0 E0) |

FIG. 11

| Cycle | 0 | 1 | 2 | 3 | 4 | 5 | 6 | 7 | 8 | 9 | 10 | 11 |
|---|---|---|---|---|---|---|---|---|---|---|---|---|
| Iss | A | B | C | D - miss | <Other Txs> | C | D | E | | | | |
| DC1 | | A | B | C | D - miss | <Other Txs> | D | C | E | | | |
| DC2 | | | A | B | C | D - miss | <Other Txs> | D | C | E | | |
| DC3 | | | | A | B | C | D - miss | - | C | D | E | |
| Strm buf (58) | | | | | A1-A3 | B1-B3 | C1-C3 | | | C1-C3 | D1-D3 | |
| Perm buf (60) | | | | | | A1 A2 A3 B0 | A3 B0 B3 C0 | | | C1 C2 C3 D0 | C3 D0 D3 E0 | |
| Reg wr | | | | | | V0.Lo (A1 B1)<br>V1.Lo (A2 B2) | V2.Lo (A3 B3)<br>V3.Lo (B0 C0) | | | V0.Hi (C1 D1)<br>V1.Hi (C2 D2) | V2.Hi (C3 D3)<br>V3.Hi (D0 E0) | |

APPARATUS AND METHOD FOR ACCESSING DATA IN A CACHE IN RESPONSE TO AN UNALIGNED LOAD INSTRUCTION

BACKGROUND

Technical Field

The present technique relates to the field of data processing. More particularly, it relates to accessing data from a data store.

Technical Background

A data processing apparatus may have a data store for storing data which can be accessed in response to data access instructions executed by the processing apparatus. For example the data store may include a memory. The data store could also comprise one or more caches for storing a subset of the data from the memory so that it can be accessed more quickly. While waiting for a required piece of data to be returned from the data store, subsequent instructions may be stalled as they may not be able to execute until the data is available. Therefore, the way in which accesses to the data store is handled can greatly affect processing performance.

SUMMARY

At least some examples provide an apparatus comprising:
load circuitry to detect an unaligned load instruction for loading from a data store an unaligned block of data which is unaligned with respect to data word boundaries of the data store, and in response to detecting the unaligned load instruction, to trigger a series of load operations for loading corresponding portions of the unaligned block of data from respective data words of the data store, the series of load operations comprising an initial load operation for loading an initial portion of the unaligned block of data and at least one subsequent load operation for loading at least one subsequent portion of the unaligned block of data;
wherein the load circuitry has a first unaligned load handling mode in which the load circuitry is configured to trigger a final load operation of said series to load a full data word from the data store, and to store in a stream buffer an excess part of said full data word that extends beyond the unaligned block of data; and
in response to a subsequent unaligned load instruction for which said initial portion of the unaligned block of data corresponds to said excess part for a preceding unaligned load instruction, the load circuitry is configured to suppress said initial load operation of the series of load operations for said subsequent unaligned load instruction.

At least some examples provide a data processing method comprising:
in response to an unaligned load instruction for loading from a data store an unaligned block of data which is unaligned with respect to data word boundaries of the data store, triggering a series of load operations for loading corresponding portions of the unaligned block of data from respective data words of the data store, the series of load operations comprising an initial load operation for loading an initial portion of the unaligned block of data and at least one subsequent load operation for loading at least one subsequent portion of the unaligned block of data; and
wherein in a first unaligned load handling mode, a final load operation of said series loads a full data word from the data store and stores in a stream buffer an excess part of said full data word that extends beyond the unaligned block of data; and
in response to a subsequent unaligned load instruction for which said initial portion of the unaligned block of data corresponds to said excess part for a preceding unaligned load instruction, suppressing said initial load operation of the series of load operations for said subsequent unaligned load instruction.

At least some examples provide an apparatus comprising:
data access circuitry responsive to a predetermined type of data access instruction to trigger a series of data access operations for accessing data in a data store, wherein subsequent data access operations of the series are dependent on at least one resource derived from a result of a preceding data access operation of the series;
wherein the series of data access operations comprise a plurality of sequences of data access operations;
a first sequence of said plurality of sequences comprises at least two of the data access operations of said series;
at least one subsequent sequence of said plurality of sequences comprises a last data access operation of a preceding sequence and at least one further data access operation of said series; and
in response to a stall condition detected for a stalling sequence which is one of said at least one subsequent sequence, the data access circuitry is configured to suspend the series of data access operations, and following resolution of the stall condition, to resume the series of data access operations from the start of the stalling sequence.

At least some examples provide a data processing method comprising:
in response to a predetermined type of data access instruction, triggering a series of data access operations for accessing data in a data store, wherein subsequent data access operations of the series are dependent on at least one resource derived from a result of a preceding data access operation of the series, wherein the series of data access operations comprise a plurality of sequences of data access operations, a first sequence of said plurality of sequences comprises at least two of the data access operations of said series, and at least one subsequent sequence of said plurality of sequences comprises a last data access operation of a preceding sequence and at least one further data access operation of said series; and
in response to a stall condition detected for a stalling sequence which is one of said at least one subsequent sequence, suspending said series of data access operations, and following resolution of the stall condition, resuming the series of data access operations from the start of the stalling sequence.

Further aspects, features and advantages of the present technique will be apparent from the following description of examples, which is to be read in conjunction with the accompanying drawings.

BRIEF DESCRIPTION OF THE DRAWINGS

FIG. 3 shows an example of use of a stream buffer when processing an unaligned load instruction for loading an unaligned block of data from the data store;

FIG. 4 is a timing diagram showing an example of processing an unaligned load instruction using the stream buffer;

FIG. 5 is a diagram illustrating different modes for handling unaligned load instructions;

FIG. 6 is a timing diagram showing an example of handling a series of unaligned load instructions according to a second unaligned load handling mode;

FIG. 7 is a timing diagram showing an example of handling a series of unaligned load instructions according to a first unaligned load handling mode;

FIG. 9 shows an example of handling a predetermined type of data access instructions using a number of sequences of data access operations;

FIG. 10 shows an example of executing the predetermined type of data access instruction when there is no stall for any of the data access operations performed for that instruction;

FIG. 11 shows an example of executing the same instruction when there is a stall.

DESCRIPTION OF EXAMPLES

Figure 1:
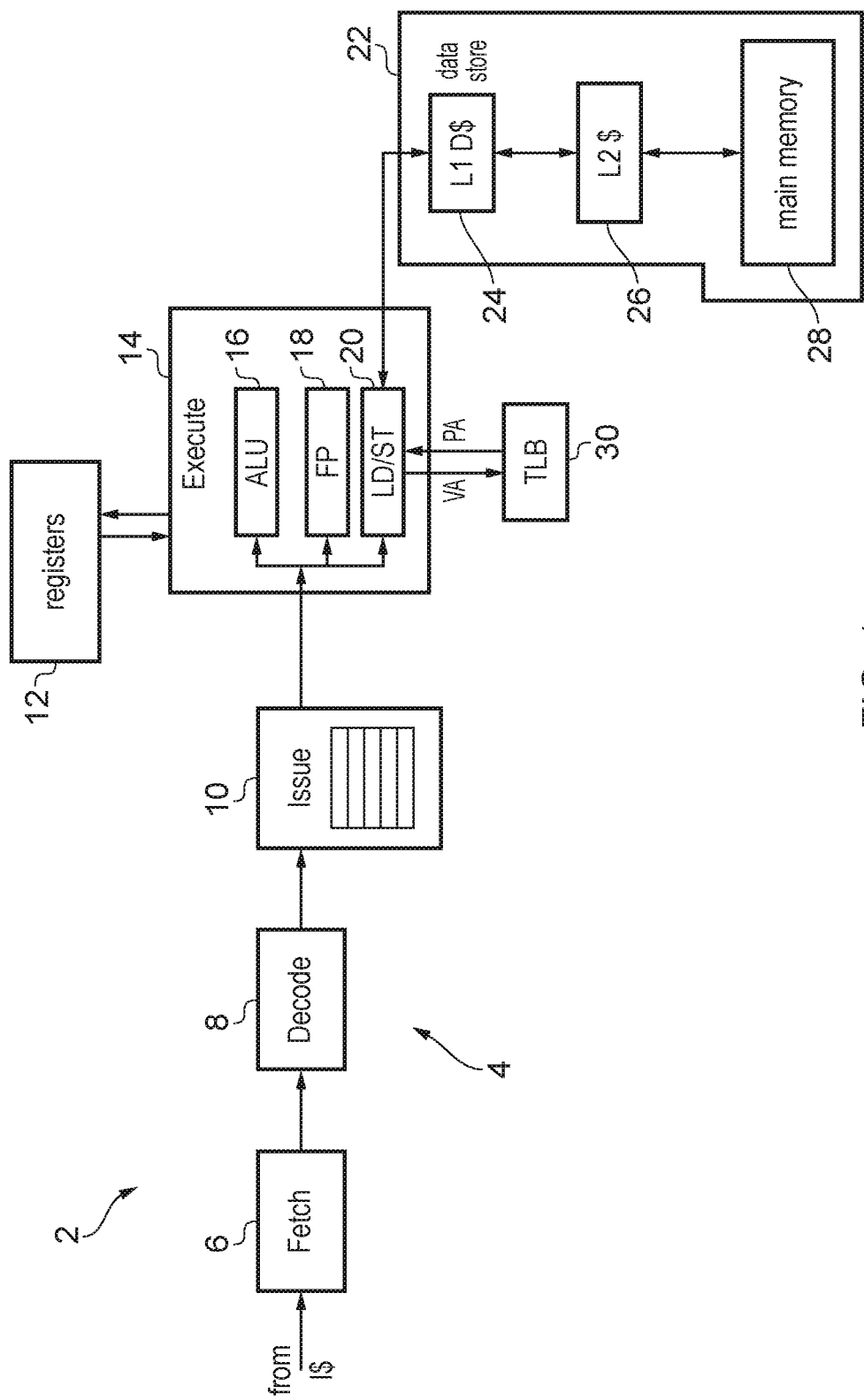
FIG. 1 schematically illustrates an example of a data processing apparatus.

Some specific example arrangements and embodiments are described below. However, it will be appreciated that the present technique is not limited to these particular embodiments.

Accesses to a data store are often managed in units of data of a given size, known as data words. For example a data word may comprise four or eight bytes of data. The data word may be the largest size block of data which can be returned in response to a single data access operation issued by the processing apparatus to the data store. To access data from a given data word, load circuitry may for example specify an address marking the start of the data word from which data is to be loaded, and provide an indication of which portions of that data word are required (e.g. a series of byte strobes may indicate which particular bytes within the data word are to be returned).

Often, a given load instruction may specify an address which is aligned with the start of a data word of the data store and in this case a block of data which is an exact multiple of the data word size can be returned using a series of one or more load operations. Some instructions may target multiple data words and so may trigger more than one load operation.

However, sometimes the apparatus may require access to an unaligned block of data which is unaligned with respect to data word boundaries of the data store. For example the unaligned block of data may start part-way through one data word. In this case, handling the load instruction can be more complex because it may require an initial load operation to load an initial portion of the unaligned block of data from one data word, and then a number of subsequent load operations for loading subsequent portions of the unaligned block of data. This may generally require an additional load operation compared to an aligned load instruction loading a block of equivalent size starting from an aligned address.

Typically, when handling an unaligned load instruction, the final load operation of the series would load a partial data word from the data store and would not load any further data of that data word past the end of the unaligned block of data to be accessed.

However, the inventor recognised that it is relatively common for a subsequent unaligned load instruction to require a remaining portion of the same data word that was targeted by the final load operation of a previous unaligned load instruction. For example, a series of unaligned load instructions may target consecutive unaligned blocks of data in the memory address space. If the final load operation of the series of loads performed for each individual unaligned load instruction only loads a partial data word from the data store, then the next unaligned load would need an additional load operation to be performed to load the initial portion of the unaligned block of data for that instruction from the same data word that was already accessed in response to previous instruction. The inventor recognised that this additional operation can be unnecessary. The final load operation of the series of loads performed for a previous unaligned load instruction can be triggered to load a full data word from the data store, and store an excess part of the full data word in a stream buffer (the excess part being the part of the data word that extends beyond the unaligned block of data for that instruction). In response to a subsequent unaligned load instruction for which the initial portion of the unaligned block corresponds to the excess part of the full data word loaded for a preceding unaligned load instruction into the stream buffer, the load circuitry may suppress the initial load of the series of load operations for that subsequent instruction which would normally load the initial portion of the unaligned block. For each subsequent unaligned load instruction this can save one load operation which over a series of instructions can provide a significant performance improvement.

The stream buffer can also be used between load operations within the series performed for a single instruction to temporarily store part of the data loaded in response to one of the load operations in the series so that it could be combined with data loaded in response to a following load operation in order to write unaligned data to a register or a further buffer. Hence, the stream buffer may already be provided for handling a stream of load operations for an individual instruction, and the first unaligned load handling mode described above may reuse the stream buffer already provided to improve performance when executing a series of unaligned load instructions.

A stream buffer identifier may be stored for identifying an address of the excess part stored in the stream buffer. Address specifying parameters of the subsequent unaligned load instruction can then be compared with the stream buffer identifier in order to determine whether the contents of the stream buffer can be used to allow the initial load operation for the subsequent unaligned load instruction to be suppressed (i.e. not performed).

There are a number of ways of implementing the stream buffer identifier. In some cases the stream buffer identifier could be an address value identifying the address of the excess part of data stored in the stream buffer. This could be an unaligned address directly identifying the start address of the excess part, or an aligned address identifying the start of a data word which comprises the excess part with the stream buffer identifier also including at least one strobe flag to identify which sub portion of the data word corresponds to the excess part. For example each strobe flag could correspond to one byte within the corresponding data word, and indicate whether that byte is within the excess part stored to the stream buffer. Identifying the excess part using an aligned address and at least one strobe flag may make comparisons with the address of the subsequent load instruction easier.

Alternatively, the stream buffer identifier may not actually identify an address of the excess part. Some unaligned load instructions could identify their target address using a base register and an offset. In this case, the stream buffer identifier may comprise the base register identifier and the offset for the unaligned load instruction. This approach may in some implementations be more practical if the actual address of the excess part may not be available in time to allow comparisons with the address of a subsequent instruction. The base register and the offset may be enough to identify whether a subsequent instruction will target an initial part of the unaligned block which matches the excess part which would be saved to the stream buffer in response to the previous unaligned load instruction.

For example, for a first type of unaligned load instruction the load circuitry may update the base register to store the target address of the instruction following the address calculation. For such instructions the load circuitry may determine that the initial portion of the unaligned block of data to be loaded in response to the subsequent unaligned load instruction corresponds to the excess part in the stream buffer when the subsequent unaligned load instruction identifies the same base register and offset as the stream buffer identifier. On the other hand, for a second type of unaligned load instruction the load circuitry may preserve the base address and the base register without updating it based on the calculation used in the offset, and in this case the initial portion and excess part may be determined to correspond when the subsequent unaligned load identifies the same base register as the stream buffer identifier and the offset of the subsequent unaligned load instruction corresponds to a sum of the offset specified by the stream buffer identifier and a certain increment value.

It will be appreciated that at the point when the load circuitry determines whether the subsequent unaligned load instruction targets an initial portion of the unaligned block which corresponds to the excess part for the preceding unaligned load instruction, the excess part may not yet have actually been stored to the stream buffer. Handling of unaligned load instructions may be pipelined and the determination of which load operations to issue for a given instruction may happen at an earlier stage than a stage at which the data is returned from the data store and placed in the stream buffer. Hence, in some cases the stream buffer identifier which identifies the address of the excess part to be stored in the steam buffer may be determined (and compared with subsequent instructions) ahead of actually storing the excess part in the stream buffer.

Some systems may permanently operate in the first unaligned load handling mode, so that the final load operation of the series performed for a given unaligned load instruction loads a full data word which extends beyond the end of the unaligned block of data to be loaded for that unaligned load instruction. In this case for any unaligned load, the full data word at the end of the unaligned block may speculatively be loaded into the streaming buffer in case a subsequent unaligned load instruction requires that excess part.

However, there may be a power cost associated with loading the excess part into the stream buffer because if the data placed in the stream buffer are not used by the subsequent unaligned mode then some power has been unnecessarily consumed in reading this data from the data store (since more cells of the data store would need to be activated to read the additional bytes).

Therefore, in some examples the load circuitry may also have a second unaligned load handling mode in which the load circuitry may trigger the final load operation of the series to load from the data store a partial data word which is entirely within the unaligned block of data. This allows energy to be saved when it is unlikely that a subsequent unaligned load will require the excess part of the data word targeted by the final load operation for the previous unaligned load instruction.

Mode selection circuitry may be provided to select whether the load circuitry operates in the first or second unaligned load handling mode based on monitoring of previous unaligned load instructions.

For example, regardless of whether the current mode is the first or second unaligned load handling mode, in response to the final load operation the load circuitry may store the stream buffer identifier identifying the excess part that corresponds to the current instruction, even if currently in the second unaligned load handling mode and the excess part is not actually being stored to the stream buffer. Hence, in the second mode the stream buffer identifier identifies the excess part that would have been stored to the stream buffer had the load circuitry been operating in the first mode. The mode selection circuitry can then monitor for subsequent instructions whether the initial portion of the unaligned block matches the excess part identified by the stream buffer identifier, i.e. whether it would have been useful for the system to be operating in the first mode.

In some cases a confidence mechanism can be provided so that a certain number of instances when it would have been useful to operate in the first mode are required before switching to the second mode. For example a counter may count instances when the initial portion corresponds to the excess part identified by the stream buffer identifier, and the mode can be switched to the first mode when the counter reaches a given threshold. Similarly, a number of events when it would not have been useful to be in the first mode may need to be detected in order to switch to the second mode.

However, in other cases it may be determined that as soon as an instance is detected when the initial portion for the subsequent unaligned load is different to the excess part for the preceding unaligned load instruction, then the process should switch back to the second unaligned handling mode since the sequence of instructions targeting consecutive unaligned blocks of data has now ended. Hence, the mode switching may be asymmetric in that the mode selection circuitry may switch the load circuitry from the second mode to the first mode in response to detecting a predetermined number (greater than one) of subsequent unaligned load instructions for which the initial portion corresponds to the excess part identified by the stream buffer, while the mode selection circuitry may switch back to the second mode in response to a single subsequent unaligned load instruction for which the initial portion does not match the excess part identified by the stream buffer identifier.

An unaligned load instruction is one example of a type of data access instruction which requires a series of data access operations where subsequent access operations of the series may be dependent on at least one resource derived from a result from a previous data access operation of the series. For example the subsequent accesses in the series may depend on the contents of the stream buffer established by the previous data access. Other examples of such types of instructions may be permuted load instructions where a block of data is loaded from a data store and written to one or more registers in a different arrangement to the arrangement of the data within the data store. In this case, while gathering enough data from the data store to allow rearranged data to be written to the registers, some data may temporarily be stored in a permute buffer and a given data access operation of the series may require the contents of the permute buffer established by a previous operation. Similarly, other types of load or store instructions could also require a series of dependent load or store operations.

For such types of instructions there can be a problem when one data access operation of the series encounters a stall condition which means that the access cannot currently be performed. For example, the stall condition could be a cache miss for one of the data access operations which requires data to be fetched from a further level cache or memory causing a delay, or could be an address translation fault where required address translation data for translating a virtual address to a physical address for the stalled data access operation has not been defined. When a stall occurs, to improve performance it may be desirable to allow the data access circuitry to process at least one other data access operation in the meantime, while any stall condition is being resolved. However, for a type of data access instruction requiring a series of dependent data access operations as discussed above, it would not typically be possible to restart the series of data access operations partway through from the point at which the stall was detected, because the remaining data access operations of the series depend on resources established by earlier data access operations. One approach may be to reserve resources derived from the earlier operations so that they cannot be discarded by other data access operations performed in the meantime while resolving the stall condition, but this would lock up certain resources within the system and may prevent other data access operations being executed efficiently. Therefore, typically for this type of data access instruction the whole series of data access operations would be repeated from the start once the stall has been resolved, which results in work already performed being repeated unnecessarily later, increases power consumption in accessing data twice from the data store, and reduces performance since performing certain operations twice not only delays the particular data access instruction which triggered the series of data access operations but may also block following instructions from being processed as quickly.

This problem can be addressed by dividing the series of data access operations to be performed for the predetermined type of data access instruction into multiple sequences of data access operations, including a first sequence comprising at least two of the data access operations of the series and at least one subsequent sequence which comprises a last data access operation of a preceding sequence and at least one further data access operation of the series. Hence, the multiple sequences are overlapping in the sense that the last data access operation of one sequence is also part of the following sequence. By using overlapping sequences of data access operations, when a stall condition is detected for a subsequent sequence other than the first sequence (this subsequent sequence encountering the stall may be referred to as the "stalling sequence"), the data access circuitry may suspend the series of data access operations and following resolution of the stall condition may resume the series of data access operations from the start of the stalling sequence. Since at least the last data access operation of the preceding sequence is also part of the stalling sequence then when the series is resumed from the start of the stalling sequence the last data access operation of the preceding sequence can be performed again to set up the at least one resource on which other operations of the stalling sequence depend. This avoids the need to restart the entire series from the start, allowing improved performance in the case when the stall condition is detected.

In some cases, in addition to the last data access operation of the preceding sequence, the subsequent sequence may also include at least one data access operation earlier than the last data access operation of the preceding sequence. Hence, successive sequences may overlap by two or more transactions. This may be useful if resources (e.g. loaded data) acquired by two or more earlier transactions are required to allow the subsequent sequence to be resumed.

When the stall condition is detected the data access circuitry may process at least one other data access operation while waiting for the stall to be resolved. Hence, other instructions can make progress while the stall is being resolved, to improve performance.

While the sequences are overlapping and the last data access operation of one sequence is also included in the next sequence, in the absence of the stall condition the data access circuitry may perform each data access operation of the series only once. Hence the last data access operation for the preceding sequence would not be repeated for the next sequence in the absence of the stall condition. On the other hand, when a stall condition does arise then the last data access operation of the preceding sequence can be repeated following resolution of a stall condition, when the series is restarted from the start of the stalling sequence.

In some cases the last data access operation of a preceding sequence may include triggering a register write to write some data to a register. In this case, when repeating the last data access operation of the preceding sequence when resuming the series from the stalling sequence following resolution of the stall, the register write triggered by the last access operation can be suppressed so that the register write happens only once even when a stall causes repetition of the last data access operation. Hence, the repetition of the last data access operation may merely repeat loading of data from a data store or establishment of resources such as a stream buffer or permute buffer, but may not trigger another register write.

The stall condition could be a delay in accessing information from storage circuitry (e.g. a cache or translation lookaside buffer (TLB)). The delay could be caused by a number of different events e.g. a cache miss which would trigger a delay while data is fetched from another cache or memory, a miss in one or more levels of a TLB, when a page table walk may be required, a case when an address to be accessed is non-cacheable and an external request is required, or when there has been a previous store to the same address but the store data is not available for forwarding.

The predetermined type of data access instruction could be an unaligned load instruction, in which case the at least one resource may include data stored in a stream buffer in response to a preceding data access of the series, or could be a permuted load instruction where the at least one resource includes data stored in a permute buffer gathered from data loaded in response to at least one earlier operation of the series. In some cases the predetermined type of data access instruction could be an unaligned permuted load instruction which uses both the permute buffer and the streaming buffer, in which case both the permute and stream buffer may be part of the required resource for a subsequent load of the series. Hence, some types of instruction may require multiple types of resource.

FIG. 1 schematically illustrates an example of a data processing apparatus 2 comprising a processing pipeline 4 for performing data processing. The pipeline 4 includes a number of stages including a fetch stage 6 for fetching instructions from an instruction cache, a decode stage 8 for decoding the fetched instructions, an issue stage 10 for determining when operands required by instructions are ready and issuing the instructions for execution when the operands are ready, and an execute stage 14 for executing the instructions to perform corresponding data processing operations using operands stored in registers 12 and writing the results of the executed instructions back to the registers 12. For example, the execute stage 14 may include a number of execute units for executing different kinds of instructions, such as an arithmetic/logic unit (ALU) 16 for executing arithmetic instructions such as add or multiply instructions or logical instructions such as OR or AND instructions, a floating point unit 18 for executing floating-point instructions using data values represented in floating point format, and a load/store unit 20 for executing load operations for loading data values from a data store 22 and storing them in the registers 12, or store instructions for storing data from the registers 12 to the data store 22. It will be appreciated this is just one example of a possible pipeline architecture and different stages could be provided in other examples. For example, in an out-of-order processor a rename stage 10 could be provided to perform register renaming for mapping architectural register specifiers specified by instructions to physical register specifiers identifying physical registers provided in hardware. Similarly, it will be appreciated that the execute units 16, 18, 20 are just one example and other examples may have different combinations of execute units for executing different kinds of instructions.

As shown in FIG. 1, the data store 22 may have a hierarchical structure including one or more caches 24, 26 and a main memory 28. The level 2 (L2) cache 26 caches a subset of data from the main memory for faster access. Similarly the level 1 (L1) data cache 24 caches a smaller subset of data from the memory 28 for faster access than the L2 cache 26. Any known caching scheme may be used to control data transfer between the respective caches and memory. In general, references to the data store 22 herein may refer to any of the caches 24, 26 and memory 28. Some embodiments may have greater or fewer levels of cache than the two levels shown in FIG. 1.

Load/store instructions executed by the pipeline 4 may identify the locations in the data store 22 to be accessed using virtual memory addresses. On the other hand the data store 22 itself may identify storage locations using a physical address. As shown in FIG. 1, a translation lookaside buffer (TLB) 30 is provided for speeding up address translations from virtual addresses to physical addresses. The TLB 30 may include several levels of translation lookaside buffers (not illustrated in FIG. 1), e.g. a level 1 (L1) TLB and a level 2 (L2) TLB, which each include a number of TLB entries for storing address translation data for respective pages of the address space. Each entry corresponds to a corresponding page of the virtual address space and maps a virtual page address identifying that page to a corresponding physical page address in the physical address space used by the data store 22. TLB entries may also specify other kinds of information such as data defining access permissions. For example the access permissions may define whether a particular process is allowed to read or write to the corresponding page of the address space. Typically the L2 TLB may include a greater number of entries than the L1 TLB, but the L1 TLB may be faster to access. In response to a given load or store instruction specifying a virtual address, the virtual address is provided to the L1 TLB and if the virtual address matches against one of the TLB entries then the page address portion of the corresponding physical address is returned to the load/store unit 20 which triggers a request to the data store 22 using the physical address (an offset portion of the virtual address may be mapped unchanged to a corresponding portion of the physical address). If the L1 TLB does not contain the required entry then it sends a request to the L2 TLB which returns the entry for the required virtual page. The entry received from the L2 TLB is allocated into one of the L1 TLB entries and the L1 TLB returns to the physical page address as before. On the other hand, if the L2 TLB also does not include the required entry then the L2 TLB can trigger a page table walk to request the required entry from page tables within main memory 28. Typically the page table walk is relatively slow and so by caching recently used TLB entries in the L1 or L2 TLBs, address translation can be made faster. It will be appreciated that other TLBs may only have one level or may have more than two levels.

Figure 2:
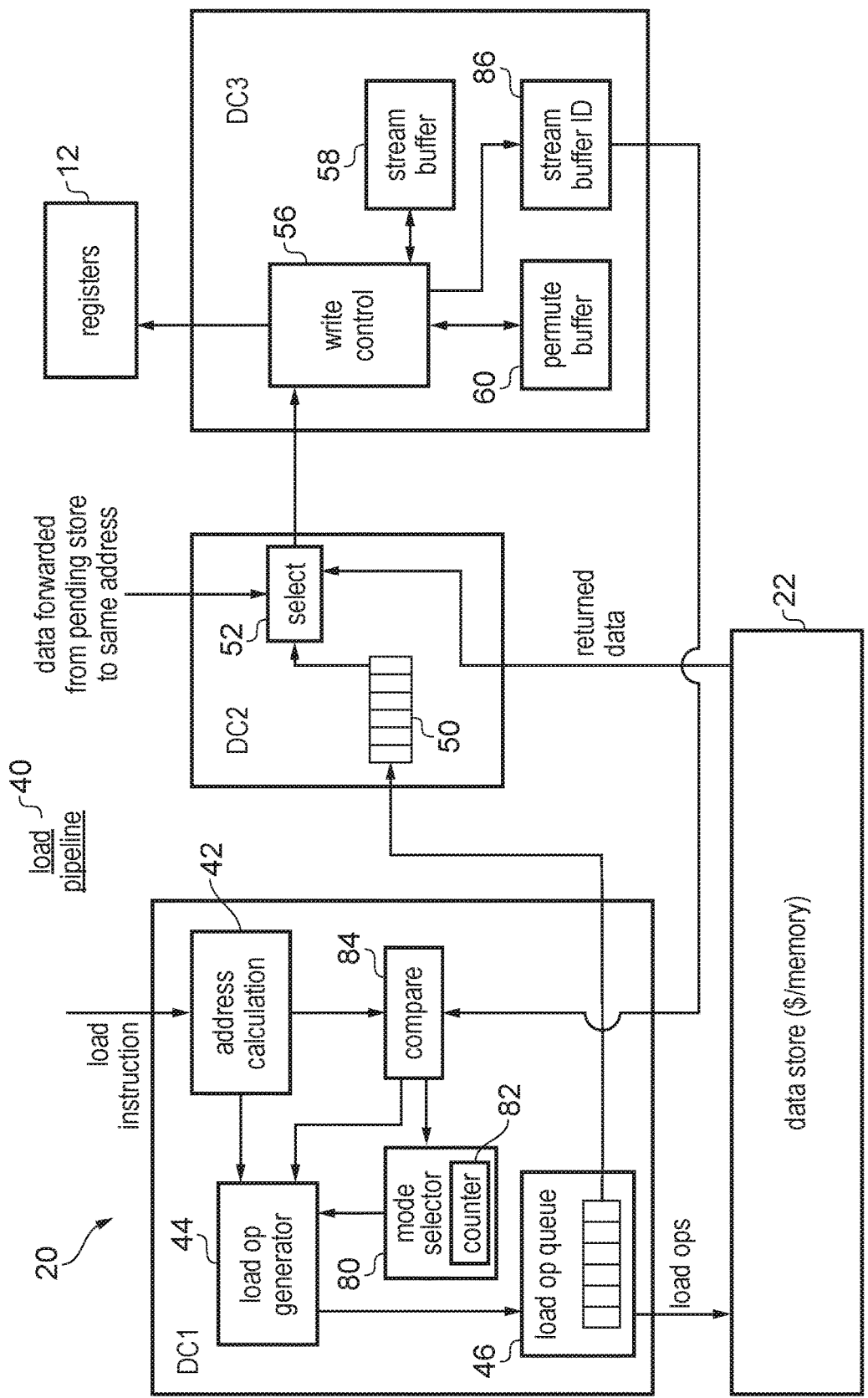
FIG. 2 shows an example of load circuitry for loading data from a data store.

FIG. 2 schematically illustrates a load pipeline 40 for processing load instructions executed by the load store queue 20. The load pipeline 40 may form part of the load/store unit 20. The load/store unit 20 may also include circuitry hr handling store instructions which is not illustrated in FIG. 2.

The load pipeline 40 includes a number of pipeline stages DC1, DC2, DC3 for handling different stages of processing of load operations. It will be appreciated that this is just one example of a possible load pipeline architecture and other examples may have different numbers of stages or may perform some functions at a different stage to the one indicated in FIG. 2.

The first load pipeline stage DC1 includes an address calculator 42 for calculating a target address of a given load instruction input to the load pipeline 40. In some cases the target address could be specified explicitly by the load instruction, but often the target address may be calculated from a base address stored in a base register identified by a base register identifier within the instruction and an offset value which may be specified either as an immediate value within the instruction or with reference to another register. For example the address calculator 42 may add the offset to the base value stored at the base register to generate the target address of the instruction. For a first type of load instruction using base address write back, having generated the target address, the target address may be written back to the base register so that for a following instruction the base address of that instruction will be the target address of the previous instruction. For a second type of load instruction which does not use base address write back, the base address may be preserved in the base register and is not updated so that a following instruction may use the same base address as the previous instruction.

The load instruction and the generated target address are provided to a load operation generator 44 which determines how many load operations are to be generated in response to the instruction and which data words are targeted by each of the generated load operations. For example, for an aligned load instruction targeting a block of one or more data words from the data store 22, the load operation generator 44 may generate a series of one or more loads each for accessing a corresponding data word from the data store 22. Unaligned load instructions where the target address corresponds to a block of data starting partway through a data word may be handled differently as discussed below. Any generated load operations are then provided to a load operation queue 46 to await issuing to the data store 22. When sufficient bandwidth is available, a load operation is pulled from the load operation queue 46 and issued to the data store 22 for servicing. The load operation than proceeds to the second load pipeline stage DC2 where it is placed in a load buffer 50 while awaiting the data to be returned from the data store 22. In systems supporting store-to-load forwarding, if there is a pending store operation which has not been carried out yet, and a load operation in the load buffer 50 targets the same address as the pending store then the data which is to be stored to the data store 22 in response to the store operation may be forwarded as the result of the load operation, so that the load operation does not actually need to wait for data to be returned from the data store 22. Hence, the second pipeline stage may include a selector 52 which may compare addresses of pending loads in the load buffer 50 with addresses of pending store operations which are not yet completed, and depending on whether these addresses match may select either data returned from the data store 22 or data forwarded from a pending store and then forward the selected data to the third pipeline stage DC3 as the result of the load.

The third pipeline stage DC3 may control how the result of a load operation is used Write control circuitry 56 may be provided for controlling writing of data returned by load instructions to registers 12. The third pipeline stage DC3 also has resources for buffering data returned by one load operation while awaiting another load operation which will gather that data and write it to the registers 12. For example, the resources may include a stream buffer 58 and a permute buffer 60. The stream buffer 58 can be used when processing an unaligned load instruction when a register needs to be written with data which spans two data words. The initial portion of the data can be loaded by one load operation and placed in the stream buffer and then a subsequent load operation may load the rest of the data from the next word of the data store 22, pull the first portion from the stream buffer 58 and write the combination to a register 12. The permute buffer 60 can be used for permuted load instructions where the block of data loaded from the data store 22 by a series of load operations is to be written to the registers 12 in a different arrangement, so that an earlier instruction may temporarily store some data in the permute buffer so that a later load operation may gather data loaded from one or more earlier instructions and write it in a different order to the registers 12. Examples of using a stream buffer 58 and permute buffer 60 will be described in more detail below.

FIG. 3 shows an example of use of stream buffer 58. A load pipeline 40 usually has a naturally aligned width in a given number of bytes N (e.g. N=8 or 16) and any load which is unaligned and accesses data which crosses that naturally aligned boundary would be split into multiple load micro operations, which may incur a performance penalty compared to an aligned load because an additional load operation may be required. Without a stream buffer 58, an instruction which accesses M chunks of data of N bytes each, starting from an unaligned address, would require 2M load operations, since each N-byte register would need to be written with portions of data spanning two consecutive data words and would therefore require two separate load operations per register write.

As shown in FIG. 3, by using the stream buffer 58, a single instruction which accesses a relatively large amount of data starting from an unaligned address only needs to incur this performance penalty on the first beat of the overall series of load operations. The first load operation would load an initial portion of the unaligned block to be loaded in response to the overall instruction and place it in the stream buffer 58. This would then be followed by one or more subsequent load operations which load subsequent portions of the unaligned block. If there are three or more load operations in the series then any middle operations (i.e. operations other than the first or last operations) would each load a full data word from the data store, stash some bytes of the data word in the stream buffer 58 and pull other bytes out of the stream buffer from the data written in response to a previous operation of the series, to obtain a full N bytes of unaligned data required for the register write. This is shown schematically in FIG. 3.

FIG. 4 shows a timing diagram explaining use of the stream buffer 58 in this way. In this example, a pair of quad registers Q is to be loaded with an unaligned block of data starting from an unaligned address 0x2 (where the aligned address of a corresponding data word would be 0x00). This example uses a data word size of 8 bytes (although it will be appreciated that other word sizes could be used). The total size of the block to be loaded comprises 32 bytes, but the overall operation requires five load transactions: an initial load issued in cycle 0 to load the initial portion of the unaligned blocks spanning addresses 0x02-0x07, three middle load operations which load full data words from the data store starting with addresses 0x08, 0x10 and 0x18, and a final load which loads the last partial data word of the unaligned block from addresses 0x20-0x21.

As shown in FIG. 4, in response to the load issued in cycle 0, the initial portion of the block is loaded from the data store 22 and placed in the stream buffer 58. In response to the middle load in cycle 1, the data from addresses 0x02-0x07 from the stream buffer 58 is combined with data from addresses 0x08-0X09 loaded by that transaction, to form an 8 byte block of unaligned data (corresponding to addresses 0x02-0x09) which is written to the register Q0. Meanwhile, the remaining part of the loaded data word corresponding to addresses 0x0A-0x0F is placed in the stream buffer 58 for the subsequent transaction to use. The transactions at cycles 2 and 3 are handled in a similar way to the transaction in cycle 1. The transaction at cycle 4 loads only a partial data word and the loaded data is appended to the contents of the stream buffer 58 to trigger the last register write. Hence, with this approach the stream buffer 58 is used to reduce the total number of cycles from 2M cycles to M+1 cycles for an instruction requiring M units of N-byte data to be loaded from an unaligned address.

This approach works well for a single unaligned load instruction. However, sometimes the load pipeline 40 may process a series of consecutive instructions which load consecutive unaligned blocks from the data store 22, where the start address for the subsequent instruction follows on consecutively from the end of the block loaded by the previous instruction. For example, a memcpy (memory copy) operation which copies a block of data from one set of addresses in memory to another set of addresses may typically require a series of consecutive loads to be executed in this way and if the start address of the block to be copied is unaligned with respect to the data word boundaries of the data store, then each of the instructions executed to implement the memcpy operation may have an unaligned start address.

An example of this is shown in FIG. 5. The top part of FIG. 5 shows how the start address of a subsequent instruction may be consecutive with the end of the unaligned block of data loaded by the previous instruction, and that the start addresses of both instructions may be unaligned with respect to data word boundaries 61. Part A of FIG. 5 shows the situation if these instructions are handled using the approach shown in FIGS. 3 and 4. In this case for each instruction the load operation generator 44 may generate an initial load operation which loads the initial portion of the unaligned block from the end of a data word in memory, zero, one or more middle load operations which load full data words from the data store, and a final load operation which loads a partial data word corresponding to the end of the unaligned block. However, if this is repeated for each instruction of the series then this would require J×M+J cycles to complete J instructions which each load an unaligned block of data corresponding to M multiples of the data word size. This is because the initial load operation would need to be performed for each successive instruction.

However, the stream buffer 58 is provided in the third pipeline stage DC3 and when the final load operation for a given instruction is carried out, instead of loading only a partial word corresponding to the unaligned block a full data word can be loaded as shown in part B of FIG. 5. Hence, the final load operation of the sequence would not only load a part of the data word which corresponds to the unaligned block to be loaded by the current instruction, but also speculatively loads an excess part 70 of the corresponding data word from the data store 22. The excess part is placed in the stream buffer 58, and if a subsequent instruction has a start address which corresponds to the start of the excess part 70 then this data can be pulled from the stream buffer 58 and so it is not necessary to issue the initial load operation 72 for that instruction. This means that the cycle penalty for performing the initial load operation 72 of the sequence would only be incurred for the very first instruction of a sequence of J unaligned instructions, and is not incurred for every instruction. This means that the number of cycles for executing J unaligned load instructions would be reduced to J×M+1, which saves J−1 cycles compared to the J×M+J cycles mentioned above for part (A) of FIG. 5. As J becomes larger this performance saving can be significant.

Hence, the load pipeline may be provided with:

A mechanism to switch into a mode where the last beat of an unaligned instruction still does a full width read, rather than just reading the low order bytes required for the final register write of the instruction, and stashes the unused bytes in the stream buffer A mechanism to allow a subsequent load to a suitable address to hit in the stream buffer and avoid spinning out an extra beat at the start to "warm up" the stream buffer A predictor to determine when it is advantageous to be in this mode (if the bytes in the stream buffer are not used by the subsequent instruction, power has been wasted in reading them).

Hence, the load pipeline 40 supports a first mode as shown in part B of FIG. 5 where the final load operation of the series for a given instruction loads a full data word from the data store, and in which the initial load operation 72 is optional so that it can be omitted if the previous instruction has loaded the full word in the final operation, and a second mode shown in part A of FIG. 5 where load instructions to unaligned addresses are handled as in FIGS. 3 and 4 with the final operation loading only a partial data word.

The first pipeline stage DC1 shown in FIG. 2 includes a mode selector 80 for selecting which mode the load pipeline is currently operating in. The mode selector 80 has a counter 82 which counts instances when successive instructions could have benefited from the first unaligned load handling mode and the mode selector 80 switches modes when the counter reaches a given threshold. The instances when an instruction could have benefited from the first mode are detected by an address comparator 84 which compares the address specifying parameters of the next instruction with a stream buffer identifier 36 identifying the excess part 70 of a data word which would be stored in the stream buffer 58 in response to the previous instruction. The stream buffer identifier 86 may be stored regardless of whether the pipeline is currently in the first mode or the second mode so that even if the second mode is being used (and so the previous instruction will not actually store the excess part 70 to the stream buffer 58), the stream buffer ID 86 is still written no that the address comparator 84 can determine whether the next instruction could have benefited if the excess part 70 had been loaded into the stream buffer 58.

While FIG. 2 shows an example where the stream buffer ID is stored in the third pipeline stage DC3 and forwarded back to the address comparator 84 in the first pipeline stage DC1, in other examples the stream buffer ID 86 could be maintained by the first pipeline stage DC1 itself since it may already be known from the addresses of loads being generated within the first pipeline stage DC1 what data will or will not be stored into the stream buffer 58 at the third pipeline stage DC3. Also, while in the example of FIG. 2 the stream buffer ID 86 may comprise an address of the excess part 70 (which could be an aligned address identifying a data word of the data store together with some byte strobes identifying which bytes of the data word have been loaded into the stream buffer 58, or could be an unaligned address directly identifying the start of the excess part), in other examples the stream buffer ID may be a base register identifier and an offset of the corresponding instruction, which can then be compared against the base register and offset used by a subsequent instruction to determine whether the consecutive instructions target neighbouring blocks of unaligned data.

FIGS. 6 and 7 show examples of handling successive unaligned load instructions using the second and first modes respectively. Both examples show execution of a pair of unaligned load instructions which each load 8 bytes of unaligned data to a corresponding register at x0, x1, with the first load loading 8 bytes of data from an unaligned address 0x02 into register x0 and the second load loading 8 bytes of unaligned data from address 0x0A to register x1.

FIG. 6 shows executing these instructions in the second unaligned load handling mode. In this case each instruction requires two cycles, one cycle to load the initial portion of the required 8 bytes from one data word and a second cycle to load the remaining portion of those 8 bytes from the next data word. As the final load operation for the first instruction (which is at the third pipeline stage DC3 in cycle 3) only loads a partial data word ending at address 0x09, for the subsequent load instruction an initial load operation is required to load the remaining portion 0x0A-0x0F of the already accessed data word and so a total of four cycles are required.

In contrast, when the first mode is used as shown in FIG. 7, the final transaction of the first load instruction issued by stage DC1 at cycle 1 loads a full data word from addresses 0x08-0x0F even though this includes an excess part 0x0A-0x0F which is not required by the first load instruction. This excess part is placed in the stream buffer in cycle 3, when the second transaction of the first instruction reaches stage DC3. Also, the stream buffer identifier 86 is set to identify the excess part 70 stored in the stream buffer 58. In this case the stream buffer identifier 86 includes a stream buffer address 0x08 (the aligned address identifying the start of the data word from which the excess part 70 was loaded) and a stream buffer strobe which includes a number of bits indicating whether corresponding bytes of the aligned data word are within the excess part 70 to be loaded into the stream buffer 58. In this example, the byte strobe is b11111100 with the '0' bits indicating that the bytes with addresses 0x08, 0x09 are not in the stream buffer and the '1' bits indicating that the more significant bytes of that data word having addresses 0x0A-0x0F will be in the stream buffer. Hence, when executing the second load instruction, the load operation generator 44 determines based on the comparator 84 that the target address 0x0A of the second load instruction is such that the initial portion of the unaligned block to be loaded for that instruction will be present in the stream buffer by the time a load operation reaches stage DC3, and so the initial load operation 72 can be suppressed and only one additional cycle is needed to carry out the second instruction.

FIGS. 6 and 7 show a simple example where there are only two instructions, so that the first mode saves one cycle compared to the second mode. However, the performance saving will be greater if there are more instructions which target consecutive parts of a common block of unaligned data.

Figure 8:
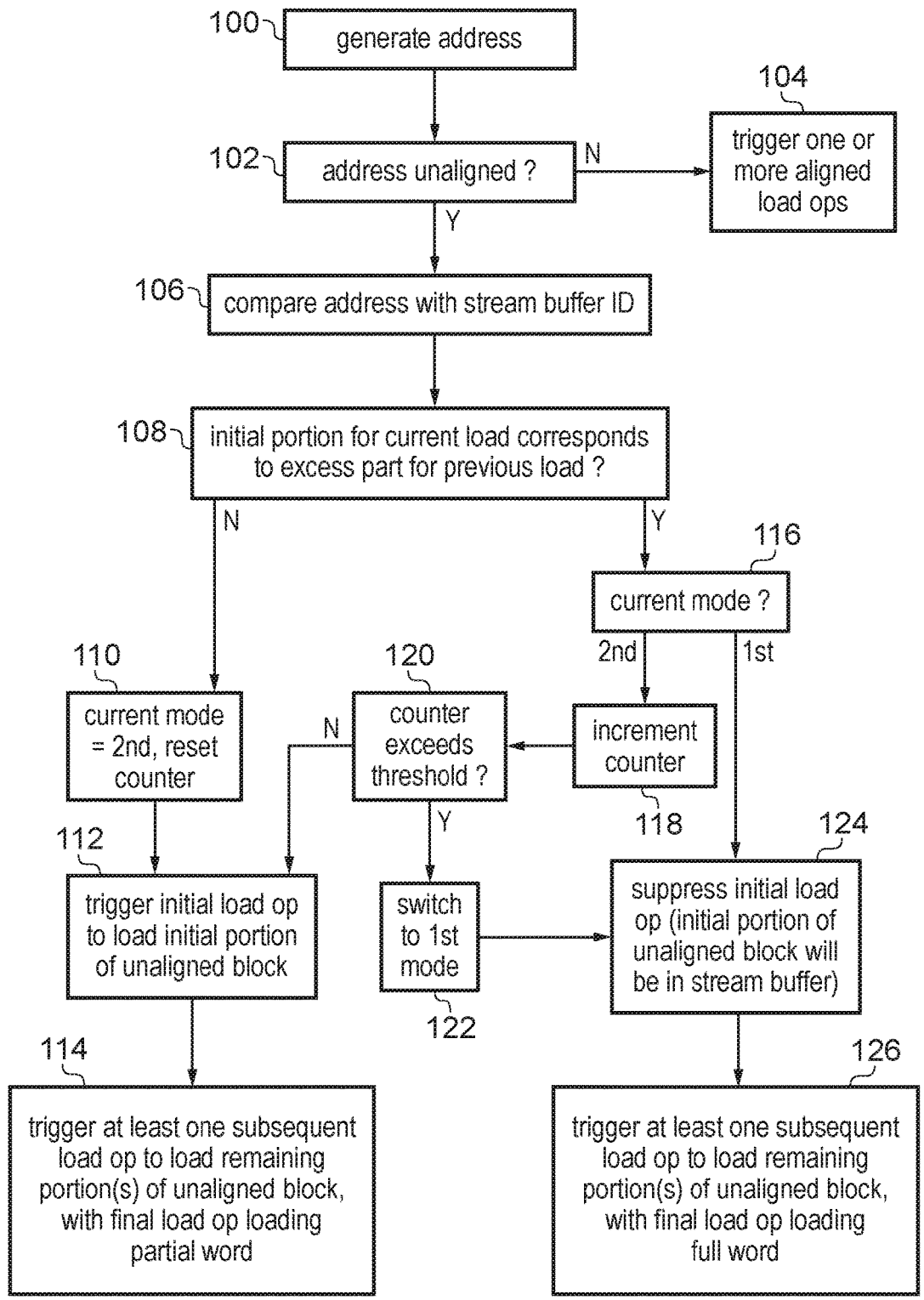
FIG. 8 is a flow diagram showing a method of handling unaligned load instructions.

FIG. 8 shows a method for handling unaligned load instructions, At step 100 the address calculator 42 generates the target address for the instruction. At step 102 the load operation generator 44 determines whether the target address is unaligned with respect to data word boundaries of the data store 22. For example, the address may be considered unaligned when it is not an exact multiple of a certain data word size. If the address is aligned, than at step 104 the load operation generator 44 triggers one or more aligned operations which load full data words from the data store 22. These can be handled according to any known technique.

If the address is unaligned then at step 106 the comparator 84 compares the target address (or the base register identifier and offset) with the stream buffer identifier 86 established for the previous instruction, and at step 108 the mode selector 80 determines based on the comparison 84 whether the initial portion that would be loaded for the current load instruction corresponds to the excess part identified by the stream buffer ID 86 for a previous load. This step is performed regardless of whether the current mode is the first or second mode since even if the previous instruction will not actually store data to the stream buffer, the stream buffer ID 86 is still set to allow the mode selector 80 to determine whether in future it would be useful to switch the first mode.

If the initial portion for the current load instruction does not correspond to the excess part for the previous load instruction, then at step 110 the current mode is set to the second mode and the counter 82 is reset. Hence, if currently in the first mode, a switch to the second mode is triggered since now the processing has reached the end of any sequence of loads which would access consecutive portions of an unaligned stream of data. At step 112 the load operation generator 44 triggers the initial load operation to load the initial portion of the unaligned block for the current instruction, and at step 114 triggers at least one subsequent load operation to load remaining portions of the unaligned block, with the final load operation loading a partial data word up to the end of the unaligned block for that instruction (without loading the full data word including the excess part). In this case, the initial load operation and any middle load operations of the series may still place data in the stream buffer as explained with respect to FIGS. 3 and 4 but the final load operation would not place any data in the stream buffer. Nevertheless, the stream buffer identifier 86 is set to identify any excess part which would have been stored in the stream buffer had the system been operating in the first mode.

On the other hand, if at step 108 the initial portion for the current load corresponds to the excess part for the previous load as identified using the stream buffer ID 86, then at step 116 the load operation generator 44 determines what the current mode is. If the current mode is the second mode, then at step 118 the mode selector 80 increments the counter 82 and at step 120 the mode selector 80 determines whether the counter exceeds a predetermined threshold. If the counter does not yet exceed the threshold then the method proceeds at step 112 to handle the current instruction in the same way as if the initial portion for the current mode had not matched the excess part for the previous load. The system remains in the second mode for now. On the other hand, if the counter exceeds the threshold at step 120 then at step 122 the current mode is switched to the first mode and then the method proceeds to step 124. Similarly, if at step 116 the current mode is the first mode then steps 118 to 122 are skipped and the method proceeds straight to step 124.

At step 124 the instruction is handled with the initial load operation suppressed for that instruction, because the initial portion of the unaligned block to be loaded in response to the current instruction will be in the stream buffer 58 by the time that instruction's first load operation reaches the third pipeline stage DC3. Hence, the initial load operation is not performed. At step 126 the load operation generator 44 triggers at least one subsequent load operation to load remaining portions of the unaligned block in a similar way to step 114, except that this time the final load operation in the series loads a full data word from the data store rather than a partial data word, and the excess part 70 at the end of the full data word is placed in the stream buffer 58. Again, the stream buffer ID 86 is set to identify the excess part.

The examples above show a system which supports both the first and second modes, but in other embodiments the system could only support the first mode. In this case, the mode selector 80 could be omitted, steps 110, 114, 116, 113, 120, 122 could be omitted from FIG. 8, and step 126 would be performed after step 112 instead of step 114. Hence, when the initial portion for the current load corresponds to the excess part for the previous load, then steps 124 and 126 are performed, while otherwise steps 112 and 126 are performed. However, given the energy cost of accessing a greater chunk of data from memory, which may be wasted if a subsequent load does not access the same initial portion of the excess parts loaded already, providing both the first and second modes and switching between them based on the mode selector at 80 in the way discussed above can be more efficient overall. In situations where it is unlikely that a subsequent load instruction could use the data placed speculatively in the stream buffer by a preceding load instruction, the second mode can be used to save power.

As discussed above, there are some load operations or store operations which can access a large chunk of memory and so may need to be broken up until multiple load or store transactions which target respective data words in the memory. The different transactions can depend on each other and so may typically need to be issued without any intervening transactions. An example of a type of transaction for which this is the case is the unaligned load instruction shown in FIG. 4 where each subsequent load operation issued for the same instruction uses the contents of the stream buffer established by the previous transaction. Another example is shown in FIG. 9 where a permuted load instruction fetches a block of data from the data store and triggers writing of that data into registers in a different arrangement to the arrangement in the data store. In FIG. 9 the top part of the diagram represents each group of 4 bytes with corresponding symbols A1, A2, A3, B0 etc. The bottom part of FIG. 9 shows how the data is written to registers. The permutation rearranges the data no that remotely separated blocks of data in the address space of the data store are gathered into a single register (e.g. A1, B1, C1, D1 are written to register V0 but this corresponds to non-adjacent addresses 0x04, 0x14, 0x24, 0x34). To allow data from a number of separate load transactions to be gathered into a single register, the permute buffer 60 is used. In the case where the block of data to be fetched from memory is unaligned with respect to data word boundaries as in the example of FIG. 9, then the stream buffer 58 may also be required. Hence, a series of transactions is required and subsequent transactions depend on at least one resource generated by an earlier transaction.

These dependencies can cause problems for some out of order processors when some of the transactions in the series can complete but others cannot, because a stall condition arises, such as when the instruction crosses a cache line boundary and part of the instruction hits while part misses in the cache, or if some of the transactions issued for a given instruction trigger address translation errors for example if a required entry is not defined in the page tables. In this scenario, the processor may be able to execute other transactions in the meantime while the stall condition for the stalled instruction is being resolved. However, in this case the necessary resource (permute or stream buffer) from earlier transactions in the sequence would typically need to be reserved to ensure it is not lost in order for later ones to be resumed later, or else the entire sequence would need to be replayed from the start once the stall has been resolved, neither of which is efficient. In typical systems, when a stall occurs the entire sequence may need to be replayed regardless of the point at which the stall was detected. This may waste a significant amount of work already carried out before the stall.

This problem can be addressed as shown in FIG. 9 by splitting the series of transactions to be issued for a given instruction into multiple sequences of reduced size. For example in FIG. 9 the transactions A, B, C are in sequence 1 and transactions C, D, E are in sequence 2. At least one transaction (transaction C in this case) is considered part of both sequences, i.e. the sequences overlap. By reducing the size of each sequence, the amount of resource which needs to be reserved in order to allow one of the sequences to be replayed is reduced since once the first sequence is complete the second sequence can be restarted from the start of the second sequence without needing to repeat the first sequence. If there is no stall then the overlapping transaction C is only performed once and is not repeated as part of the second sequence, and the five transactions would be issued back to back. However, if there is a stall for one of the transactions in sequence 2 then following resolution of the stall, the second sequence can be resumed from the start of transaction C without needing to perform transactions A and B first.

FIGS. 10 and 11 show an example of this technique, showing the timings at which the transactions A to E shown in FIG. 9 are issued. In the example of FIG. 10, no stall arises and so the five transactions are issued back to back and proceed through the respective pipeline stages DC1 to DC3. Each transaction triggers loading of the corresponding data A1-A3, B0-B3, C0-C3, D0-D3, E0 from respective data words in the data store as shown in FIG. 9. In cycle 3, transaction A reaches pipeline stage DC3 and the loaded data A1-A3 is placed in the stream buffer ready for cycle 4. In cycle 4, transaction B reaches DC3 and loads B0-B3 from the data store, with B1-B3 being placed in the stream buffer 58 and data values A1, A2, A3, B0 being placed in the permute buffer 60. In cycle 4, the register write to the lower halves of registers V0, V1 could take place but it is deferred for a cycle because there are some other instructions for which the register write could not occur until the following cycle and so for symmetry of handling different kinds of instructions the register write may be delayed until cycle 5. The register writes to registers V0-V3 are performed in pairs of half registers, so that each write writes to either the lower halves or the upper halves of a pair of registers V0, V1 or V2, V3. This allows the register writes to be pipelined more efficiently because fewer transactions must reach stage DC3 before the first pair of half registers can be written.

In cycle 5, transaction C reaches stage DC3 and loads data C0-C3 from the data store, of which data C1-C3 is placed in the stream buffer 58. The transaction also triggers a register write of data A1 B1 A2 B2 to the lower halves of registers V0 V1 by selecting the appropriate data from the stream buffer and the permute buffer as established by the previous transactions. Meanwhile the data A3 B0 B3 C0 is placed in the permute buffer (A3 and B0 were already there but B3 is taken from the stream buffer and C0 is taken from the data loaded by transaction C).

The subsequent transactions D and E similarly load a portion of data from the data store, place some of that data in the stream buffer 58 or permute buffer 60 and trigger a register write using 4-byte chunks of data selected either from the stream buffer 58, the permute buffer 60 or the data loaded by that transaction in order to populate the registers V0-V3 in the way shown in FIG. 9.

While FIG. 10 shows the final transaction E of the sequence not placing any data in the stream buffer 58, it will be appreciated that the technique discussed above could also be applied, so that when operating in the first unaligned instruction handling mode then transaction E could still place the excess part of the targeted data word in the stream buffer so that subsequent instructions can proceed more quickly.

FIG. 11 shows the same set of transactions executed when a stall occurs for transaction D. Transactions A to C are executed in the same way as in FIG. 10. A cache miss occurs for transaction D and no to avoid delaying other data access instructions, the series of transactions A to E is suspended while waiting for the stall to be resolved i.e. for the data to be loaded into the cache from main memory for example. In the meantime some other transactions can be executed. For conciseness FIG. 11 shows those other transactions taking only one cycle, but it will be appreciated that the other transactions may take more than one cycle depending on how long it takes for the stall to be resolved.

Once the stall is resolved, the series of transactions A to E is resumed, starting from the start of sequence 2 with transaction C being repeated. By repeating transaction C, the stream buffer 58 is warmed up ready for transaction D to be performed. However, when transaction C is repeated, this time it does not trigger a register write because this is already being performed in cycle 6 the first time transaction C was executed. Hence, the repeated transaction C loads data C1-C3 into the stream buffer 58 so that the subsequent transaction D can then proceed. Having repeated transaction C, transactions D and E are handled in the same way as in FIG. 10.

In this example, transaction C did not depend on the contents of the permute buffer 60 from an earlier instruction because the data writes for A3 B0 B3 C0 had already been written to memory and none of the subsequent instructions relies on any data from transactions A to C other than C1-C3 which can be loaded again into the stream buffer. However, if the sequences are divided such that the start of the second or subsequent sequence being replayed does rely on resource from an earlier instruction, then at least one resource can be reserved. However, by splitting the overall series into sequences at the points when there will not be such a dependency prior to the overlapping transaction C, then there is no need to reserve any resource while the stall is being resolved and so the other transactions can make full use of the resource available.

In summary, by allowing overlapping sequences of transactions with at least one transaction belonging to multiple sequences, the overlapping transaction only being executed once in the common case without a stall, but providing logic to detect when that transaction needs to be executed again as part of a new sequence and suppressing the register write if required, this can allow such series of dependent transactions to be handled more efficiently.

While the example of FIGS. 9 to 11 shows a series of transactions divided into two sequences, for longer series they could be divided into three or more sequences with each pair of neighbouring sequences overlapping by at least one transaction to allow the series to be resumed from a later sequence if there is a stall in that sequence.

Also, while the example of FIGS. 9 to 11 shows a case where the two sequences overlap by one transaction, in other examples the overlapping portion of two adjacent sequences may comprise two or more transactions. This may be useful if the first non-overlapping transaction of a second sequence requires resources acquired by two or more earlier transactions of a first sequence. By defining an overlap of more than one transaction, this avoids the need to reserve resources (e.g. the contents of the permute buffer) between completing the first sequence and restarting the second sequence. Hence, in addition to the last transaction of the preceding sequence, a subsequent sequence may also include at least one earlier transaction of the preceding sequence.

Figure 12:
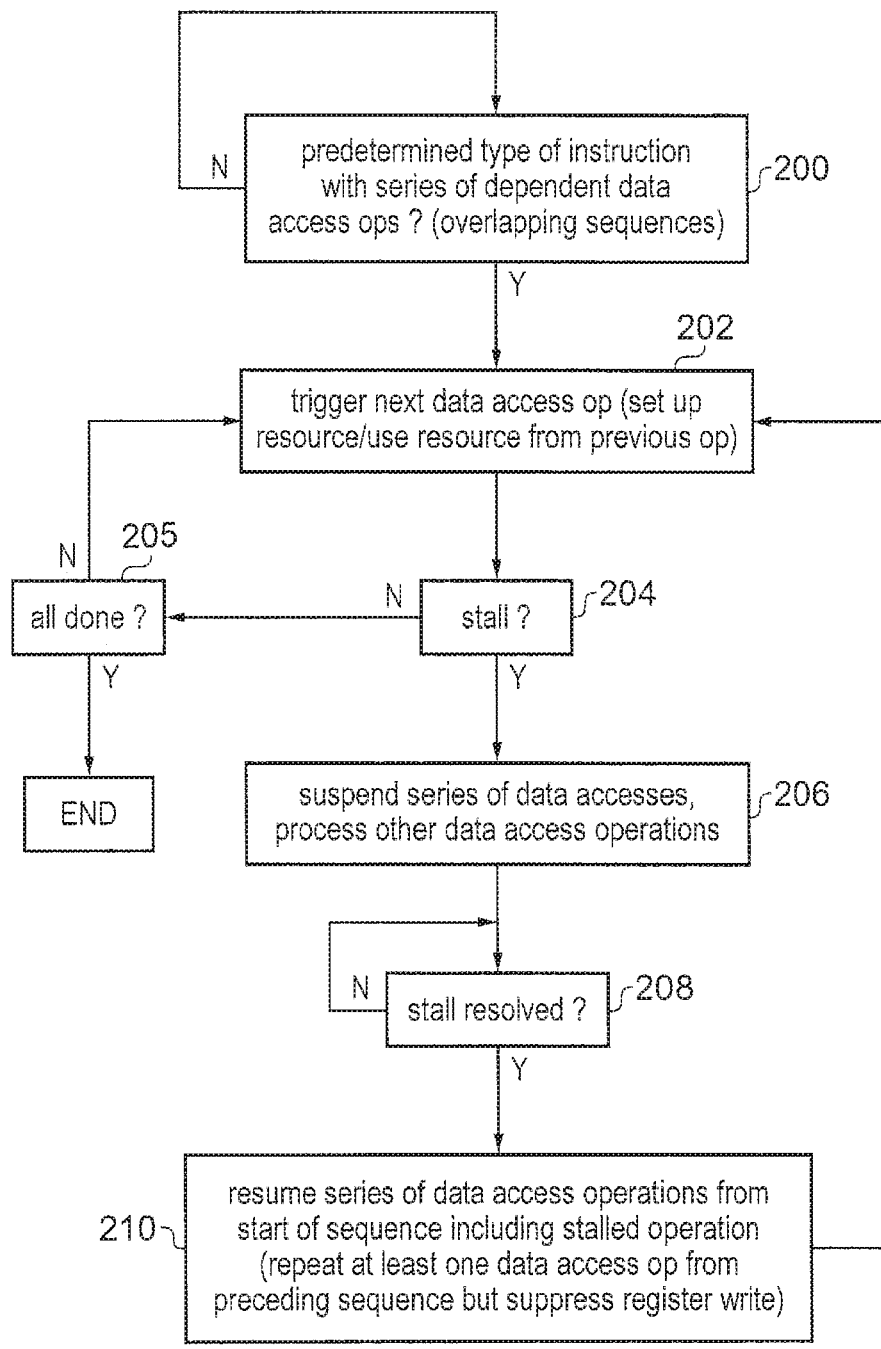
FIG. 12 is a flow diagram illustrating a method of handling a predetermined type of data access instruction which requires a series of dependent data accesses.

FIG. 12 shows a method of handling such types of instructions requiring a series of dependent data access operations. At step 200 the load store unit 20 detects whether there is a predetermined type of instruction with a series of dependent data access operations that can be divided into overlapping sequences. If so then at step 202 the load store unit starts triggering the next data access operation. The data access operation may either set up a resource to be used by a subsequent data access operation of the series, or use a resource from a previous operation, or both. At step 204 it is determined whether there is a stall for that data access operation, such as a cache miss or TLB error. If not then the transaction proceeds as normal and the load is carried out together with any population of the resources such as the stream buffer 58 or permute buffer 60. At step 205 it is determined whether this is the last data access operation to be triggered. If so then the process ends but if there is at least one remaining operation to be performed then the method returns to step 202 to trigger the next operation.

On the other hand, if there is a stall at step 204, then at step 206 the current series of data accesses is suspended so that other data access operations can be processed in the meantime while the stall is resolved. At step 208 it is determined whether the stall has been resolved yet and if not then the system continues to be process other operations. To determine whether the stall has been resolved, the load circuitry could for example detect whether an indication has been received from a cache or TLB signalling that the required data or TLB entry is now available (or will soon be available). Once the stall has been resolved, then at step 210 the series of data access operations for the predetermined type of instruction is resumed, starting at the stalled sequence which included the stalled operation. In this case, at least one data access from a preceding sequence is repeated but any register write triggered by that operation may be suppressed. Hence, the repeated access may load data to warm up the stream buffer 58, the permute buffer 60 or both, rather than triggering a register write. The method then returns to step 202 again to trigger the next operation.

While the flow diagrams in this application show a sequential series of steps, it will be appreciated that such steps may be pipelined to some extent for respective instructions. Also, some steps could be performed in parallel or in a different order.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An apparatus comprising:
    load circuitry to detect an unaligned load instruction for loading from a cache an unaligned block of data which is unaligned with respect to data word boundaries of the cache, and in response to detecting the unaligned load instruction, to trigger a series of load operations for loading corresponding portions of the unaligned block of data from respective data words of the cache, the series of load operations comprising an initial load operation for loading an initial portion of the unaligned block of data and at least one subsequent load operation for loading at least one subsequent portion of the unaligned block of data;
    wherein:
    the load circuitry has a first unaligned load handling mode in which the load circuitry is configured to trigger a final load operation of said series to load a full data word from the cache, and to store in a stream buffer an excess part of said full data word that extends beyond the unaligned block of data; and
    in response to a subsequent unaligned load instruction for which said initial portion of the unaligned block of data corresponds to said excess part for a preceding unaligned load instruction, the load circuitry is configured to suppress said initial load operation of the series of load operations for said subsequent unaligned load instruction;
    the load circuitry has a second unaligned load handling mode in which the load circuitry is configured to trigger said final load operation of said series to load from the cache a partial data word entirely within the unaligned block of data; and the apparatus comprises mode selection circuitry to select whether the load circuitry operates in the first unaligned load handling mode or the second unaligned load handling mode in dependence on monitoring of previous unaligned load instructions.

2. The apparatus according to claim 1, wherein in response to at least one load operation other than said final load operation of said series, the load circuitry is configured to store at least part of the data loaded from the cache in the stream buffer; and in response to each of said at least one subsequent load operation of said series, the load circuitry is configured to trigger a write to a register or a further buffer using the data store in the stream buffer in response to a preceding load operation of the series and at least part of the data loaded from the cache in response to that subsequent load operation.

3. The apparatus according to claim 1, wherein in the first unaligned load handling mode, the load circuitry is configured to store a stream buffer identifier indicative of an address of the excess part; and in response to the subsequent unaligned load instruction, the load circuitry is configured to determine whether said initial portion of the unaligned block of data corresponds to said excess part for the preceding unaligned load instruction based on the stream buffer identifier.

4. The apparatus according to claim 3, wherein the stream buffer identifier comprises an address value indicative of said address of the excess part.

5. The apparatus according to claim 4, wherein the address value comprises an unaligned address directly identifying the address of the excess part.

6. The apparatus according to claim 4, wherein the address value comprises an aligned address of a target data word of the cache comprising said excess part, and the stream buffer identifier further comprises at least one flag identifying which sub-portion of said target data word corresponds to said excess part.

7. The apparatus according to claim 3, wherein the unaligned load instruction comprises a base register identifier identifying a base register storing a base address and identifies an offset of a target address relative to said base address; and said stream buffer identifier comprises said base register identifier and said offset.

8. The apparatus according to claim 7, wherein in response to a second type of unaligned load instruction, the load circuitry is configured to preserve the base address in the base register; and in response to the subsequent unaligned load instruction when the preceding unaligned load instruction is of the second type, the load circuitry is configured to determine that said initial portion of the unaligned block of data corresponds to said excess part for a preceding unaligned load instruction when the subsequent unaligned load instruction identifies the same base register as said stream buffer identifier and the offset of the subsequent unaligned load instruction corresponds to a sum of the offset of the stream buffer identifier and an increment.

9. The apparatus according to claim 1, wherein in response to the subsequent unaligned load instruction, the load circuitry is configured to trigger one or more load operations for loading, from the cache, a block of data of a smaller size than said unaligned block of data.

10. The apparatus according to claim 1, wherein when in the second unaligned load handling mode, the load circuitry is configured to store a stream buffer identifier identifying the excess part that would have been stored in the stream buffer had the load circuitry been operating in the first unaligned load handling mode.

11. The apparatus according to claim 10, wherein the mode selection circuitry is configured to switch the load circuitry from the second unaligned load handling mode to the first unaligned load handling mode in response to detecting a predetermined number of subsequent unaligned load instructions for which the initial portion of the unaligned block of data corresponds to the excess part identified by the stream buffer identifier.

12. The apparatus according to claim 1, wherein the mode selection circuitry is configured to switch the load circuitry from the first unaligned load handling mode to the second unaligned mode handling mode in response to detecting a subsequent unaligned load instruction for which the initial portion of the unaligned block of data is different to the excess part for the preceding unaligned load instruction.

13. An apparatus comprising:
load circuitry to detect an unaligned load instruction for loading from a cache an unaligned block of data which is unaligned with respect to data word boundaries of the cache, and in response to detecting the unaligned load instruction, to trigger a series of load operations for loading corresponding portions of the unaligned block of data from respective data words of the cache, the series of load operations comprising an initial load operation for loading an initial portion of the unaligned block of data and at least one subsequent load operation for loading at least one subsequent portion of the unaligned block of data;

wherein:
the load circuitry has a first unaligned load handling mode in which the load circuitry is configured to trigger a final load operation of said series to load a full data word from the cache, and to store in a stream buffer an excess part of said full data word that extends beyond the unaligned block of data;

in response to a subsequent unaligned load instruction for which said initial portion of the unaligned block of data corresponds to said excess part for a preceding unaligned load instruction, the load circuitry is configured to suppress said initial load operation of the series of load operations for said subsequent unaligned load instruction;

in the first unaligned load handling mode, the load circuitry is configured to store a stream buffer identifier indicative of an address of the excess part;

in response to the subsequent unaligned load instruction, the load circuitry is configured to determine whether said initial portion of the unaligned block of data corresponds to said excess part for the preceding unaligned load instruction based on the stream buffer identifier;

the unaligned load instruction comprises a base register identifier identifying a base register storing a base address and identifies an offset of a target address relative to said base address;

said stream buffer identifier comprises said base register identifier and said offset;

in response to a first type of unaligned load instruction, the load circuitry is configured to update the base register to store said target address; and in response to the subsequent unaligned load instruction when the preceding unaligned load instruction is of the first type, the load circuitry is configured to determine that said initial portion of the unaligned block of data corresponds to said excess part for a preceding unaligned load instruction when the subsequent unaligned load instruction identifies the same base register and offset as said stream buffer identifier.

14. A data processing method comprising:

in response to an unaligned load instruction for loading from a cache an unaligned block of data which is unaligned with respect to data word boundaries of the cache, triggering a series of load operations for loading corresponding portions of the unaligned block of data from respective data words of the cache, the series of load operations comprising an initial load operation for loading an initial portion of the unaligned block of data and at least one subsequent load operation for loading at least one subsequent portion of the unaligned block of data; and wherein in a first unaligned load handling mode, a final load operation of said series loads a full data word from the cache and stores in a stream buffer an excess part of said full data word that extends beyond the unaligned block of data; and in response to a subsequent unaligned load instruction for which said initial portion of the unaligned block of data corresponds to said excess part for a preceding unaligned load instruction, suppressing said initial load operation of the series of load operations for said subsequent unaligned load instruction;

in a second unaligned load handling mode, triggering said final load operation of said series to load from the cache a partial data word entirely within the unaligned block of data; and selecting whether the load circuitry operates in the first unaligned load handling mode or the second unaligned load handling mode in dependence on monitoring of previous unaligned load instructions.

15. The data processing method according to claim 14, further comprising:

in response to at least one load operation other than said final load operation of said series, storing at least part of the data loaded from the cache store in the stream buffer; and in response to each of said at least one subsequent load operation of said series, triggering a write to a register or a further buffer using the data stored in the stream buffer in response to a preceding load operation of the series and at least part of the data loaded from the cache in response to that subsequent load operation.

16. The data processing method according to claim 14, further comprising:

in the first unaligned load handling mode, storing a stream buffer identifier indicative of an address of the excess part; and in response to the subsequent unaligned load instruction, determining whether said initial portion of the unaligned block of data corresponds to said excess part for the preceding unaligned load instruction based on the stream buffer identifier.

17. The data processing method according to claim 16, wherein the stream buffer identifier comprises an address value indicative of said address of the excess part.

18. The data processing method according to claim 17, wherein the address value comprises an unaligned address directly identifying the address of the excess part.

19. The data processing method according to claim 17, wherein the address value comprises an aligned address of a target data word of the cache comprising said excess part, and the stream buffer identifier further comprises at least one flag identifying which sub-portion of said target data word corresponds to said excess part.

20. The data processing method according to claim 16, wherein the unaligned load instruction comprises a base register identifier identifying a base register storing a base address and identifies an offset of a target address relative to said base address; and said stream buffer identifier comprises said base register identifier and said offset.

21. The data processing method according to claim 20, further comprising:

in response to a first type of unaligned load instruction, updating the base register to store said target address; and in response to the subsequent unaligned load instruction when the preceding unaligned load instruction is of the first type, determining that said initial portion of the unaligned block of data corresponds to said excess part for a preceding unaligned load instruction when the subsequent unaligned load instruction identifies the same base register and offset as said stream buffer identifier.

22. The data processing method according to claim 20, further comprising:

in response to a second type of unaligned load instruction, the load circuitry is configured to preserve the base address in the base register; and in response to the subsequent unaligned load instruction when the preceding unaligned load instruction is of the second type, the load circuitry is configured to determine that said initial portion of the unaligned block of data corresponds to said excess part for a preceding unaligned load instruction when the subsequent unaligned load instruction identifies the same base register as said stream buffer identifier and the offset of the subsequent unaligned load instruction corresponds to a sum of the offset of the stream buffer identifier and an increment.

23. The data processing method according to claim 14, wherein when in the second unaligned load handling mode, the method comprises storing a stream buffer identifier identifying the excess part that would have been stored in the stream buffer had the load circuitry been operating in the first unaligned load handling mode.

24. The data processing method according to claim 14, comprising:

in response to the subsequent unaligned load instruction, triggering one or more load operations for loading, from the cache, a block of data of a smaller size than said unaligned block of data.

* * * * *